United States Patent [19]

LeBrise

[11] 4,222,476

[45] Sep. 16, 1980

[54] TORSION DAMPING DEVICE FOR FRICTION PLATE HAVING A FLEXIBLE CENTER

[75] Inventor: Raymond LeBrise, Montmorency, France

[73] Assignee: Societe Anonyme Francaise du Ferodo, Paris, France

[21] Appl. No.: 831,232

[22] Filed: Sep. 7, 1977

[30] Foreign Application Priority Data

Sep. 23, 1976 [FR] France ................................ 76 28561

[51] Int. Cl.² ............................................. F16D 47/02
[52] U.S. Cl. .................................................. 192/106.2
[58] Field of Search .......................... 192/106.1, 106.2; 64/27 F

[56] References Cited

U.S. PATENT DOCUMENTS

| | | | |
|---|---|---|---|
| 2,826,902 | 3/1958 | Coursey | 192/106.2 |
| 3,428,155 | 2/1969 | Binder et al. | 192/106.2 |
| 3,578,121 | 5/1971 | Maurice | 192/106.2 |
| 3,931,876 | 1/1976 | Beeskow | 192/106.2 |

Primary Examiner—George H. Krizmanich
Attorney, Agent, or Firm—Charles E. Brown

[57] ABSTRACT

A torsion damping device for a friction clutch plate having a flexible center or damping hub comprising a pair of annular guiding plates forming one part, on opposite sides of a web on a hub, forming another part, a circumferential array of springs interposed between the annular guiding plates. Friction means operate between the parts over a limited range of angular displacement. At least part of the friction means is carried by annular support members axially coupled to one of the annular guide plates, drive means provided with clearance between the support members and the web.

21 Claims, 10 Drawing Figures

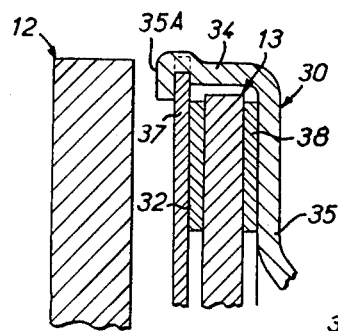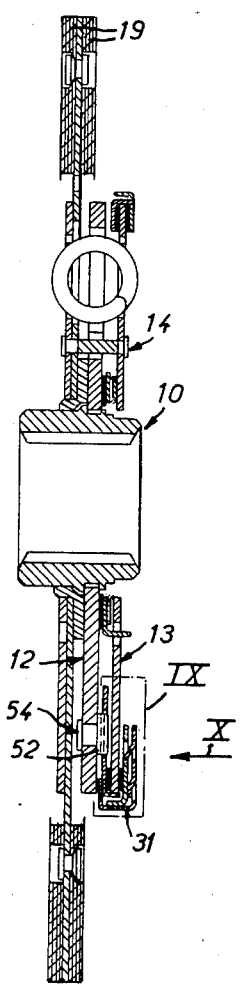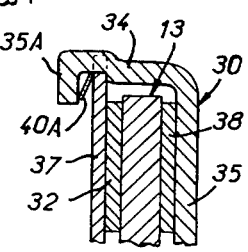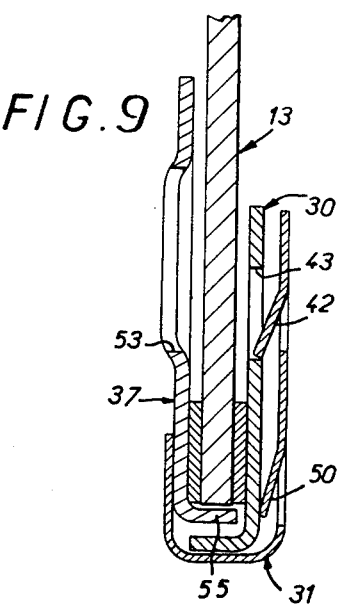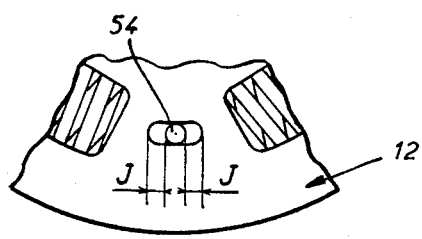

//4,222,476//

TORSION DAMPING DEVICE FOR FRICTION PLATE HAVING A FLEXIBLE CENTER

BACKGROUND OF THE INVENTION

The present invention relates to torsion damping devices, particularly for the friction plates of friction clutches.

It relates generally to torsion damping devices which comprise two coaxial parts mounted to rotate with respect to each other, within a predetermined range of angular clearance, namely one part comprising a web and another part comprising two annular guide members disposed one on each side of said web and connected to each other by cross-pieces parallel to the axis of the assembly, and a circumferential array of resilient means interposed between said parts of rotational connection thereof.

The present invention relates more particularly, but not exclusively, to torsion damping devices of the friction clutch plate with a so-called flexible center, particularly for a motor vehicle.

In such a friction clutch plate, one of the coaxial parts carries a friction disc, which is provided with friction linings at its periphery, on each of its faces, and which is thus adapted to be gripped between two members rotating with a shaft, in practice a driving shaft, whilst the other of said parts is fast with a hub, which is adapted to be engaged on another shaft, in practice a driven shaft.

Such a friction clutch plate insures controlled transmission of rotary torque between the part which rotates with a driving shaft and the other part which rotates with a driven shaft, i.e. filters audible vibrations which may, moreover, be produced along the whole kinematic chain in which said driving and driven shafts are interposed.

It is known to insert between the two coaxial parts of such a friction clutch plate, surface friction means adapted to introduce a hysteresis effect in the operating characteristics of said friction clutch plate; this hysteresis effect translates into a difference, for the same angle of clearance between the two coaxial parts of the friction clutch plate, between the value of the torque transmitted between these parts of a first direction of clearance, commonly known as forward direction, and the value of this torque transmitted for the opposite direction, commonly known as reverse direction.

It has proved, in fact, that for certain applications such a hysteresis effect contributes to a reduction of the vibrations and noise emitted by all the rotary members of the kinematic chain which includes the driving and driven shafts between which the clutch friction plate is interposed.

Depending on the operating characteristics to be obtained, at least part of the friction means may be used only for one portion of the predetermined range of angular clearance between the two coaxial parts of the friction clutch plate.

In any case, in the friction clutch plates of this type, the friction means are usually constituted by friction washers inserted axially between the web and one and/or the other of the annular guide plates along the inner periphery thereof.

This results in the internal structure of such a friction clutch plate being determined by its friction washers and in the hysteresis characteristics being associated with those friction washers.

Now, for certain particular applications, it is desirable to be able to adapt the hysteresis characteristics of such a friction clutch plate to the stiffness of its springs, this stiffness itself being chosen as a function of the conditions of use of the friction plate.

For the above reasons, such an adaptation has proved difficult, if not impossible, to the present time.

SUMMARY OF THE INVENTION

It is a general object of the invention to provide an arrangement enabling this difficulty to be overcome.

More precisely, it relates to a torsion damping device comprising two coaxial parts mounted to rotate with respect to each other, within a predetermined range of angular clearance, namely one part comprising a web and another part comprising two annular guide plates disposed one on each side of said web and connected to each other by cross-pieces, a circumferential array of resilient means interposed between said parts, and friction means adapted to operate between said parts during at least part of said range of angular clearance, said friction means acting on one of said annular guiding plates, and at the outer periphery thereof, at least part of said friction means being carried by an annular support member axially coupled to said one annular guiding plate in cooperation with axially acting resilient means and drive means being provided between said support member and said web.

As will be readily understood, such an annular support member and the friction means which it carries may or may not, as desired, simply and economically equip a torsion damping device of the type for which it has been produced, even if this device is part of a pre-existing friction clutch plate, without the internal axial structure of this device, and therefore of this friction, slade being modified.

It is therefore advantageously possible, according to the invention, to modify as required the hysteresis characteristics of such a device, and therefore of such a friction plate by providing this device with one or more friction means according to the invention, or, in other words, to produce, with a reduced number of basic parts, torsion damping devices, and therefore friction clutch plates, having different hysteresis characteristics which are specifically adapted to their actual use.

The invention will be more readily understood on reading the following description with reference to the accompanying drawings.

BRIEF DESCRIPTION OF THE DRAWINGS

FIG. 6 is a view similar to FIG. 5 of an alternative embodiment;

FIG. 7 shows a detail of FIG. 6 for a variant;

FIG. 8 is a view in axial section similar to that of FIG. 2 and concerning an other alternative embodiment;

FIG. 9 shows, on a larger scale, a detail of FIG. 8 included in inset IX thereon;

FIG. 10 is a detailed view in the direction of arrow X of FIG. 8, parts having been torn away.

DESCRIPTION OF THE PREFERRED EMBODIMENTS

Figure 1:
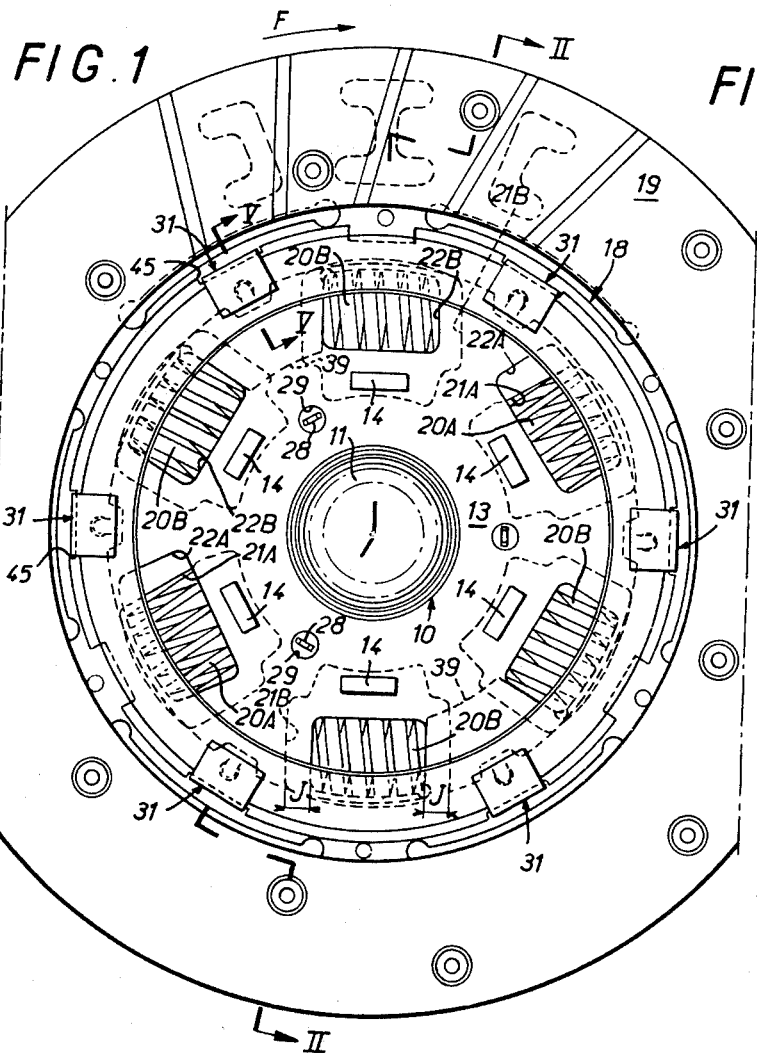
FIG. 1 is a partial view in elevation, of a friction clutch plate with damped or flexible center according to the invention.
Figure 2:
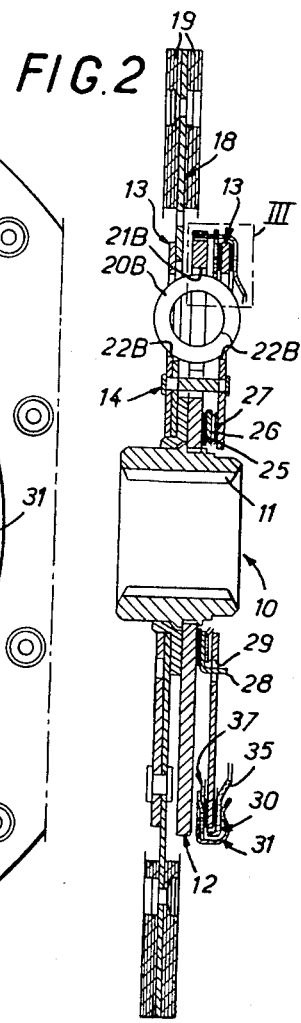
FIG. 2 is a view in axial section of this friction clutch plate, along broken line II—II of FIG. 1.

These Figures illustrate the use of the invention for a friction plate of a friction clutch with damped or flexible center.

In the embodiment shown, this friction clutch plate generally comprises a hub 10 provided on its inner periphery with grooves 11, for its coupling in rotation with a shaft, and radially bearing on its outer periphery a hub web 12, two annular guide plates 13 disposed one on each side of the hub web 12 and connected to each other by cross-pieces 14, in the manner described hereinafter, a friction disc 18 adjacent and securely fastened to one of the annular guide plates 13 and bearing on its periphery and on each of its faces, friction linings 19, and an annular array of resilient means between the annular guide plate 13 and the hub web 12.

These resilient means comprise, in manner known per se, two sets of coil springs 20A, 20B, two springs 20A and four springs 20B, disposed tangentially in housings formed in part by windows 21A, 21B formed in the hub web 12 and in part by windows 22A, 22B formed in the annular guide plates 13.

In the example shown, the two springs 20A are mounted in opposition with respect to each other and are, for the rest position of the friction clutch plate, in contact with the hub web 12 at one of their ends, and in contact with the annular guide plates 13, at the other ends.

Conversely, springs 20B are, in the rest position of the friction plate, in contact, at their ends, only with guide plates 13, the circumferential extent of the corresponding windows 21B of the hub web 12 being greater than that of the corresponding windows 22B of the annular guide plates 13 and extending circumferentially with clearance J on each side of the guide plates.

In the illustrated example, the cross-pieces 14 connecting the annular guide plates 13 to one another are flat cross-pieces, i.e. cross-pieces of which the transverse section of the running part, between the annular guide plates is rectangular and is elongated tangentially vis-a-vis the corresponding circumference of these guide plates.

In the illustrated embodiment, the diameter of this circumference is smaller than that of the circumference on which springs 20A,20B are located, and the cross-pieces 14 pass through the hub web 12 via radial extensions of the windows 21A,21B of the hub in which said springs are housed.

These cross-pieces 14 further pass through passages in the annular guide plates 13 and are crimped beyond them.

When the friction disc 18 is rotated in the direction of arrow F in FIG. 1, the hub web 12 is first urged in rotation only via one of the springs 20A, which is compressed, the other being relaxed, until the circumferential clearance J between the windows 21B and 22B, serving as housing for springs 20B, has been taken up, for that direction of rotation.

After taking up this circumferential clearance J, the effect of the springs 20B are added to those of springs 20A, within the predetermined angular clearance between the coaxial rotary parts of the friction clutch plate, namely on the one hand the part formed by the hub web 12 and on the other hand the part formed by the annular guide plate 13 and the friction disc 18 in the embodiment shown, the limits of angular clearance being determined by a complete circumferential compression of springs 20A and/or springs 20B and/or from a positive rotation of the hub web 12 by the cross-pieces 14, by the latter coming into abutment.

These features are well known per se and will not be described in greater detail.

Likewise in manner known per se, friction means are further provided between the two coaxial rotary parts of the friction clutch plate, for the introduction of a hysteresis effect in the operating characteristics thereof, as set forth hereinabove.

In the embodiment shown, these friction means comprise a friction washer 25 interposed axially between the hub web 12, which belongs to one of the coaxial parts of the friction clutch plate, and one of the annular guide plate 13 of the other said coaxial part.

In practice, and as is shown, this friction washer 25 is, via a distribution washer 26 to which it is optionally securely fastened, e.g. by gluing, subjected to the effects of an axially resilient washer 27 of the "ONDUFLEX" type, for example, abutting on said one annular guide plate 13 in the embodiment shown, the distribution washer 26 is locked in rotation on the guide plate by axial lugs 28 penetrating into passages 29 in one annular guide plate.

The friction means comprising friction washer 25 is present along the entire angular range of clearance of the two coaxial parts of the friction clutch plate.

According to the invention, supplementary friction means are provided, which are carried by an annular support member 30 axially coupled to the guide plate 13 which is not adjacent the friction disc 18, in cooperation with axially acting resilient means.

In the embodiment shown in FIGS. 1 to 5, the annular support member 30 is disposed with respect to the outer face of said one annular guide plate 13, i.e. the face of the washer which is opposite the hub web 12, and carries a friction lining 32 in contact with the annular guide plate; said friction lining 32 may form an annularly continuous ring and is for example connected by gluing to the annular support member 30 which carries it.

In the embodiment shown, the annular support member 30 is, on its outer periphery, bordered by a raised edge 34 which extends axially at right angles to the peripheral edge of said one annular guide plate 13 beyond the same; on its inner periphery, it is bordered by a frustoconical raised edge 35 which extends obliquely towards the axis of the assembly, moving away from said one annular guide plate 13.

These raised edges 34 and 35 advantageously insure a reinforcement of their annular support members 30. It should be noted that the raised edge 36 may be of some shape other than frustoconical, particularly with a view to strengthening the construction.

In the embodiment shown, another annular support member 37 is associated with said annular support member 30, which is disposed with respect to the inner face of said one annular guide plate 13, i.e. on the side of that face of the annular guide plate which faces the hub web 12, and which carries in contact with the annular guide plate, a friction lining 38. Thus, in the embodiment shown, two annular support members 30,37 each carrying friction means 32,38 are disposed axially one on each side of said one annular guide plate 13. As before, the friction lining 38 carried by the annular support member 37 may form an annularly continuous ring and it is connected for example by gluing, to the annular support member 37.

In the example shown, this annular support member 37 is, contrary to the annular support member 30 with which it is associated, flat overall. At its inner periphery, it comprises in diametrically opposite positions with respect to each other, two radial lugs 39, of trapezoidal contour, which extend radially towards the axis of the assembly, and which are each inserted between two successive springs 20B.

In any case, the annular support member 30 is axially coupled to the annular guide plate 13 by clips 31 and, in the embodiment shown, the latter also couple to the annular plate the annular support member 37 associated therewith.

In the embodiment shown in FIGS. 1 to 5, there are thus six clips 31 forming independent parts, which are regularly annularly spaced apart around the axis of the assembly.

Each of these clips, which is for example made of suitably cut out and folded metal, is generally in the form of a U and is engaged radially on said one annular guide plate 13 and the annular support members 30, 37 which surround the annular guide plate.

In the embodiment illustrated in FIGS. 1 to 5, the axially acting resilient means associated with such a clip 31 form an integral part thereof and result from a simple deformation of said clip; in the embodiment shown, a corrugation 40 elastically bears each clip 31 on the annular support member 30.

Radial holding means are further preferably provided between each clip 31 and any one of the annular support members 30,37.

In the embodiment shown in FIGS. 1 to 5, these radial holding means comprise a lug 42 radially cut out from that part of a clip 31 which is in contact with the annular support member 37, this lug being deformed radially and engaged in a recess 43 provided to this end in said support member 37.

It is obvious that, in a variant, such a radial holding lug could be cut out of the annular support member 37, or from the annular support member 30, for cooperation with a recess provided to this end in clip 31.

It is also obvious that such a lug may further insure the circumferential blocking of such a clip 31 on the associated annular support member 30,37.

However, in the embodiment shown in FIGS. 1 to 5, each clip 31 is blocked circumferentially on the annular support member 37 by radial engagement on said support member by means of a notch 45 accordingly provided on the peripheral edge of said support member.

Finally, drive means are provided between the hub web 12 and any one of the annular support members 30,37 according to the invention.

In the embodiment shown in FIGS. 1 to 5, these drive means comprise at least one lug 46 which, axially extending the raised edge 34 of the annular support member 30, is, after passage through a notch 47 accordingly provided on the peripheral edge of the annular support member 37, engaged in a recess in the hub web 12.

Figures 3, 4, 5:
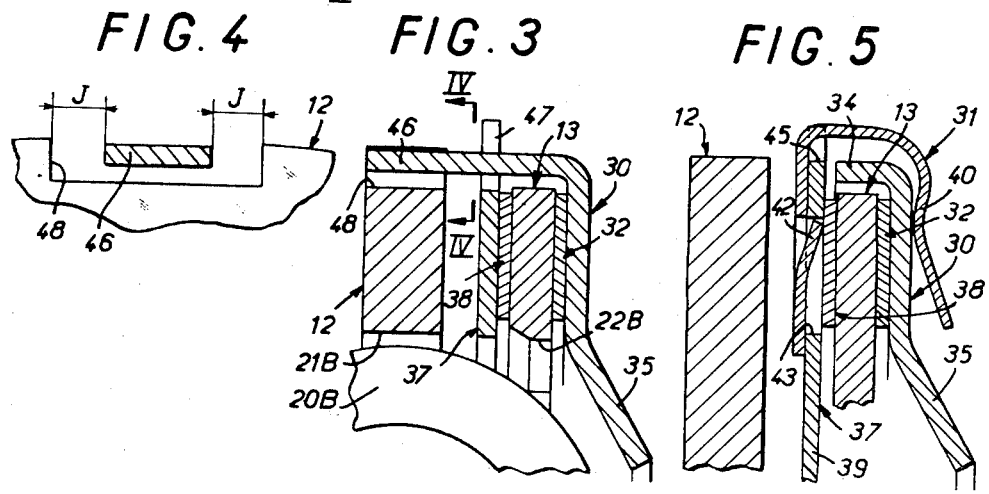
FIG. 3 shows a detail of FIG. 2, on a larger scale, included in inset III thereon.
FIG. 4 is a partial view in section along line IV—IV of FIG. 3.
FIG. 5 is a partial view in axial section, on the same scale as FIG. 3, of the friction plate according to the invention along line V—V of FIG. 1.

In the embodiment shown, this recess comprises a notch 48 in the peripheral edge of the hub web 12 (FIG. 3).

In any case, the engagement of lug 46 in such a recess is provided in the embodiment of FIG. 4, with a circumferential clearance J to each side of said lug 46, for the rest position of the friction clutch plate; this circumferential clearance J is identical to the circumferential clearance J provided, as described hereinabove, between the windows 21B,22B serving as housings for springs 20B.

Of course, the annular support member 30 may thus be provided with a plurality of lugs 46, preferably regularly angularly spaced.

Consequently, when this circumferential clearance J is taken up as mentioned hereinabove, the hub web 12 drives the annular support member 30 and thus the annular support member 37 associated therewith, by its lug or lugs 46, so that, the rotation of the friction disc 18 in the direction of arrow F of FIG. 1 being continued, the friction linings 32, 38 carried by this annular support member 30, 37 add their effect to that of the friction washer 25 and the hysteresis of the friction clutch plate are accrued.

When the friction disc 18 returns to its initial position, the springs 20B, between which the radial lugs 39 of the annular support member 37 are circumferentially interposed, return said annular support member 37 and thus the annular support member 30 with which it is associated, to their initial position.

As will be noted, the annular support members 30,37 according to the invention and the friction means which they bear, may as required, be connected to said one annular guide plate 13, the hub web 12 theoretically being provided with the or each notch or other suitable recess adapted for the possible engagement with clearance of the or each axial lug 46 with which the annular support member 30 is provided.

This is an assembly which may be made easily, rapidly and economically even on a pre-existing friction clutch plate, without modification of the structure thereof, since this assembly merely involves the use of simple resilient clips 31.

In addition, the annular guide plate 13, the annular support members 30,37 which are associated therewith, the friction linings 32,38 carried by said support members, and the clips 31 axially coupling said support members to annular guide plate jointly form a unit adapted to be assembled individually, so that the positioning of said one annular guide plate 13 on the associated friction clutch plate may be effected without modification of the arrangement usually employed for such positioning.

Finally, it will be noted that the resilient biasing force by which the annular support members 30,37 carrying linings 32,38 according to the invention are applied against said one annular guide plate 13 may advantageously be modified by varying the number of clips 31 which couple these annular support members to said guide washer, and/or by varying the stiffness of the individual clips.

Reference will now be made to FIG. 6 where the arrangement is similar to that of FIG. 5 but where the tightening of the friction washers 32 and 38 is obtained not by a corrugation in clip 31, but directly by the elasticity of the support member 37, substantially continuously or at intervals, at least the peripheral part of the support member itself constituting an axially acting conical or "ONDUFLEX" washer.

In addition, in this alternative embodiment, the clip 31 described previously are integral with the support member 30, the raised edge 34 of this support comprising extensions 35A which are directly crimped on the support member 37, these crimping extensions 35A thus axially coupling said support members 30,37 to the annular guide plates 13 instead of the previous clips 31; as a variant, a similar arrangement is applied to the support member 37, the clips 31 then being integral therewith.

The arrangement of FIG. 7 is similar to that of FIG. 6, but the axially acting resilient means associated with the means which couple the support members 30,37 to the guide washer 13 form at least one independent part and comprise for example in this case an axially acting washer 40A, e.g. conical washer, as shown, or of an "ONDUFLEX" washer interposed between the support member 37 and the crimping extensions 35A of the support member 30.

According to the alternative embodiment illustrated in FIG. 8 to 10, the axially acting resilient means associated with a clip 31 comprise a lug 50, which is cut out radially on that part of such a clip which is disposed on the annular support member 30 side, and which is deformed so as to abut elastically against said annular support member 30.

In the embodiment shown, the annular support member 30 does not comprise a raised frustoconical edge on its inner periphery and it is provided, for each clip 31, with a recess 43 adapted to cooperate radially with a lug 42 cut out to this end in such a clip 31.

In addition, in this alternative embodiment, the drive means provided between the hub web 12 and any one of the annular support members 30,37 according to the invention comprise a boss 52 projecting from said hub web 12 and engaged in a recess 53 provided in the annular support member 37, i.e. in that annular support member 30 or 37 which is disposed on the inner face side of the annular guide plate 13, with, as before, a circumferential clearance J to each side (FIG. 10).

In the example shown, this boss 52 comprises the head of a rivet 54 connected to the hub web 12, but it is obvious that it could be a suitable deformation of this hub web integral therewith, and for example by the end of a tongue cut out radially to this end from said hub web 12.

Of course, a plurality of bosses 52 of this type may be provided, their preferably being regularly angularly spaced around the axis of the assembly.

In addition, for its reinforcement, the annular support member 37 is provided on its outer periphery with a raised edge 55 which extends radially at right angles to the peripheral edge of said annular guide plate, beyond said washer.

The operation of this embodiment and the advantages thereof are similar to those described hereinabove with reference to the embodiment illustrated in FIGS. 1 to 5.

Of course, the present invention is not limited to the embodiments which have been described and shown, but covers all modifications and/or combinations of their various elements.

In particular, although with reference to FIGS. 1 to 5 and 8 to 10, the axially acting resilient means associated with the clips 31 are simply integrated therewith so that said clips thus assure a double function of assembly and tightening, the axially acting resilient means could also be independent of such clips, and for example be incorporated in one and/or the other of the support members 30, 37 as in the embodiment of FIG. 6, or interposed between these clips or their equivalent and one and/or the other of the annular support members 30,37 as in the embodiment of FIG. 7.

Furthermore, the friction clutch plate does not necessarily comprise a friction washer 25, the friction means carried by the or each annular support member according to the invention being on the contrary capable of being the only ones to operate between the two coaxial rotary parts thereof; they could also operate permanently, the circumferential clearance J being eliminated.

In addition, although the invention has been more particularly described with reference to the friction surface of a clutch with damping hub or flexible center in which the friction disc is carried by that rotary part which comprises the annular guide plates, the web associated with the latter being, in this case, a hub web securely fastened to the corresponding hub, it is obvious that it also applies to the case of the friction disc being carried by the other rotary part of a friction plate, namely the part which comprises the web, the annular guide plates then being securely fastened to the hub associated therewith.

Finally, the field of application of the invention is obviously not limited to that of friction clutch plate, but includes all torsion damping devices which comprise two coaxial parts rotating with respect to each other, with a circumferential array of resilient means interposed as described hereinabove, the parts being able, for example, to be connected individually to shaft to be coupled.

What is claimed is:

1. A torsion damping device comprising two coaxial parts mounted to rotate with respect to each other, within predetermined range of angular clearance, including a first part comprising a web and second part comprising two annular guide plates disposed one on each side of said web, cross-pieces interconnecting said annular guide plates, a circumferential array of resilient means circumferentially interposed between said parts, friction means adapted to operate between said parts for at least part of said range of angular clearance, said friction means being disposed at the outer periphery of one of said annular guide plates, at least a part of said friction means being carried by an annular support member axially coupled to said one annular guide plate in cooperation with axially acting resilient means, drive means being provided between said support member and said web, a clip forming an independent U-shaped member engaged radially on the support member and the annular guide plate which said support member flanks.

2. A torsion damping device comprising two coxial parts mounted to rotate with respect to each other within a predetermined range of angular clearance, a first coaxial part comprising a web and a second coaxial part comprising two annular guide plates disposed one on each side of said web, cross-pieces interconnecting said annular guide plates, a circumferential array of resilient means circumferentially interposed between said parts, friction assembly adapted to operate between said parts for at least part of said range of angular clearance, said friction assembly being disposed at the outer periphery of one of said annular guide plates, said friction assembly including two annular support members one axially coupled to each side of said one annular guide plate in cooperation with axially acting resilient means, drive means being provided between said annular support members and said web, said annular support members are coupled axially to said one annular guide plate by at least one clip, said axially acting resilient means acting between said clip and said annular support members to urge the same towards said one annular guide plate, friction means carried by each of said annular support members and disposed axially on each side of said one annular guide plate, said one annular guide plate having an outer face corresponding to one of said sides, one of said annular support members which is disposed on the side of the outer face of said one annular guide plate being bordered by a peripheral reinforcing edge.

3. A torsion damping device comprising two coaxial parts mounted to rotate with respect to each other, within predetermined range of angular clearance, including a first part comprising a web and second part comprising two annular guide plates disposed one on each side of said web, cross-pieces interconnecting said annular guide plates, a circumferential array of resilient means circumferentially interposed between said parts, and friction means adapted to operate between said parts for at least part of said range of angular clearance, said friction means being disposed at the outer periphery of one of said annular guide plates, at least a part of said friction means being carried by an annular support member axially coupled to said one annular guide plate in cooperation with axially acting resilient means, drive means between said support member and said web, the annular support member being coupled axially to said one annular guide plate by at least one clip, said axially acting resilient means acting between said clip and said support member to urge the same towards said one annular plate guide, and radial holding means between the clip and said annular support member.

4. A device as claimed in claim 3, wherein said radial holding means comprises a lug radially cut out from said clip and engaged in a recess carried by said support member.

5. A torsion damping device comprising two coaxial parts mounted to rotate with respect to each other, within predetermined range of angular clearance, including a first part comprising a web and second part comprising two annular guide plates disposed one on each side of said web, cross-pieces interconnecting said annular guide plates, a circumferential array of resilient means circumferentially interposed between said parts, friction means adapted to operate between said parts for at least part of said range of angular clearance, said friction means disposed at the outer periphery of one of said annular guide plates, at least a part of said friction means being carried by an annular support member axially coupled to said one annular guide plate in cooperation with axially acting resilient means, drive means being provided between said support member and said web, the annular support member is coupled axially to said one annular guide plate by at least one clip, and the said axially acting resilient means acting between said clip and said support member to urge the same towards said one annular plate guide, and said clip being locked circumferentially on an annular support member by radial engagement in a notch along the peripheral edge of the support member.

6. A torsion damping device comprising two coaxial parts mounted to rotate with respect to each other, within predetermined range of angular clearance, including a first part comprising a web and second part comprising two annular guide plates disposed one on each side of said web, cross-pieces interconnecting said annular guide plates, a circumferential array of resilient means circumferentially interposed between said parts, friction means adapted to operate between said parts for at least part of said range of angular clearance, said friction means disposed at the outer periphery of one of said annular guide plates, at least a part of said friction means being carried by an annular support member axially coupled to said one annular guide plate in cooperation with axially acting resilient means, drive means being provided between said support member and said web, the resilient means interposed between said parts comprising tangentially disposed springs, and at least one of said annular support members having at least one radial part between two successive springs.

7. A torsion damping device comprising two coaxial parts mounted to rotate with respect to each other within a predetermined range of angular clearance, including a first part comprising a web and a second part comprising two annular guide plates disposed one on each side of said web, cross-pieces interconnecting said annular guide plates, a circumferential array of resilient means circumferentially interposed between said parts, an independently mounted friction subassembly disposed at the outer periphery of and engaged radially with one of said guide plates, said friction subassembly comprising at least one annular support member on one side of said one guide plate, friction means carried by said one side of said guide plate for contact with said support member, said friction subassembly further comprising axially acting resilient means urging said support member towards said one guide plate, and drive means between said support member and said web.

8. A device as claimed in claim 7, wherein the axially acting resilient means are integrally formed with said support member.

9. A device as claimed in claim 7, wherein the axially acting resilient means form at least one independent part.

10. A device as claimed in claim 7, wherein the drive means provided between said web and said support member comprise an element projecting from such a support member and engaged in a recess in said web.

11. A friction clutch plate comprising a torsion damping device, one said coaxial part being fast with a hub and the other said coaxial part carrying a friction disc, wherein said torsion damping device being constructed in accordance with claim 7.

12. A friction clutch plate as claimed in claim 11 in which the friction disc is adjacent the other of said annular guide plates of the torsion damping device and said annular support member carrying said friction means is associated with said one annular guide plate.

13. A torsion damping device comprising two coaxial parts mounted to rotate with respect to each other within a predetermined range of angular clearance, including a first part comprising a web and a second part comprising two annular guide plates disposed one on each side of said web, cross-pieces interconnecting said annular guide plates, a circumferential array of resilient means circumferentially interposed between said parts, an independently mounted friction subassembly disposed at the at the outer periphery of and engaged radially with one of said guide plates, said friction subassembly comprising at least one annular support member on one side of said one guide plate, friction means carried by said one side of said guide plate for contact with said support member, said friction subassembly further comprising axially acting resilient means urging said support member towards said one guide plate, and drive means between said support member and said web, said friction subassembly further comprising a clip including said axially acting resilient means acting between the rest of said clip and said support member.

14. A device according to claim 13, wherein a second annular support member is provided flanking said one guide plate, second friction means carried by the other side of said one guide plate for contact with said second support member.

15. A device according to claim 13, wherein said axially acting resilient means is integrally formed with said one support member and is crimped to a second support member disposed on the other side of said guide plate with second friction means therebetween.

16. A device as claimed in claim 14, wherein the two annular support members are axially coupled to said one annular guide plate by said clip, which forms part of said friction subassembly and includes said axially acting resilient means.

17. A device as claimed in claim 13, wherein the axially acting resilient means comprise a deformed portion of said clip.

18. A device as claimed in claim 13, wherein the axially acting resilient means are formed by a part cut from said clip.

19. A device as claimed in claim 13, wherein said drive means are provided between said web and said support member disposed on the side of said one annular guide plate and comprise a boss projecting from the web and engaged in a recess in said web.

20. A device as claimed in claim 13, wherein there are provided a plurality of said clips regularly annularly spaced about the axis of said device.

21. A device as claimed in claim 14, wherein at least one of the annular support members is bordered on its outer periphery by a raised edge which extends axially at right angles to the peripheral edge of said one annular guide plate, beyond the same.

* * * * *